(12) United States Patent
Aoki

(10) Patent No.: US 6,775,222 B2
(45) Date of Patent: Aug. 10, 2004

(54) OPTICAL DISC

(75) Inventor: Ikuo Aoki, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 09/841,054

(22) Filed: Apr. 25, 2001

(65) Prior Publication Data

US 2002/0003770 A1 Jan. 10, 2002

(30) Foreign Application Priority Data

Apr. 25, 2000 (JP) ........................................ 2000-124191
Feb. 5, 2001 (JP) ........................................ 2001-028286

(51) Int. Cl.$^7$ ................................................ G11B 7/00
(52) U.S. Cl. .............................. 369/124.04; 369/47.22; 369/44.13
(58) Field of Search ...................... 369/124.04, 47.22, 369/275.3, 275.4, 44.13

(56) References Cited

U.S. PATENT DOCUMENTS 6,469,979 B1 * 10/2002 Joo et al. ................. 369/275.3

* cited by examiner

Primary Examiner—Nabil Hindi
(74) Attorney, Agent, or Firm—Staas & Halsey LLP

(57) ABSTRACT

An optical disc which is a rewritable optical disc using a phase change medium or a magneto-optical (MO) medium, or a write once type optical disc using a pigment based medium, and has a track for recording user data, in which a wobble portion waved in a radial direction of the optical disc and a non-wobble portion that is not waved are provided on the track, first sub-information and second sub-information which are data other than the user data are recorded on the track by being overlapped, by using a combination of the wobble portion and the non-wobble portion, in the first sub-information, the length of at least one of the wobble portion and the non-wobble portion is different when a bit takes a logical value "0" and when the bit takes a logical value "1", and in the second sub-information, the phase of a wave in the wobble portion when a bit takes a logical value "0" is different from the phase of a wave in the wobble portion when the bit takes a logical value "1".

32 Claims, 11 Drawing Sheets

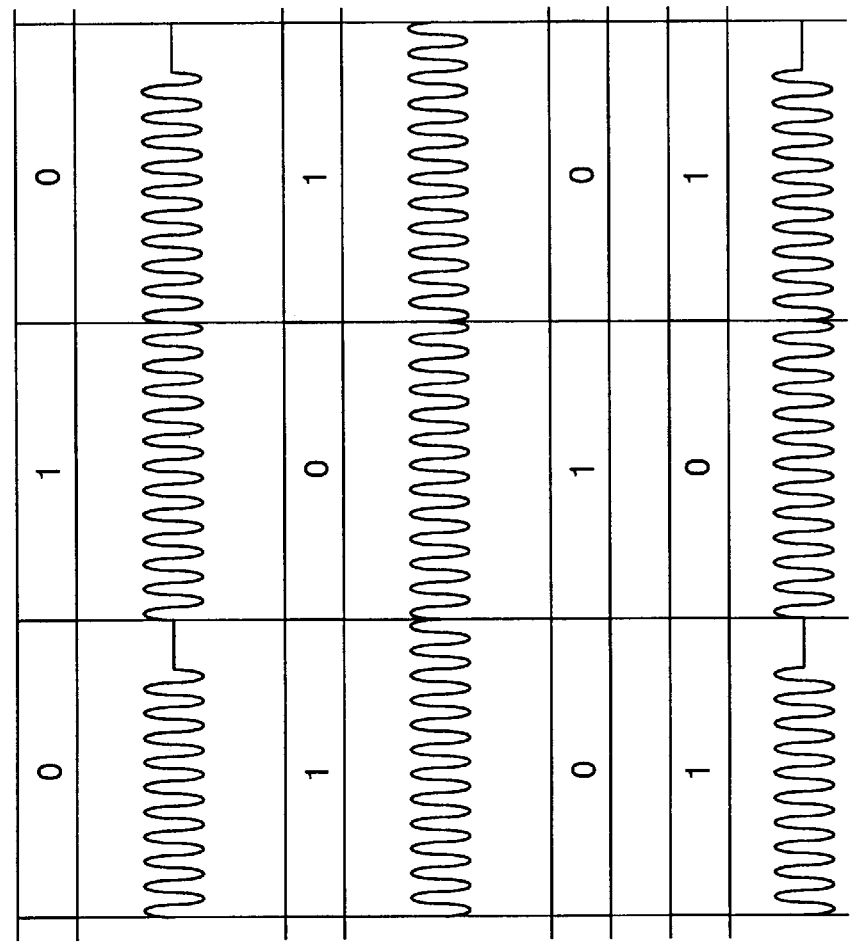
FIG. 3A  FIRST SUB-INFORMATION DATA BIT STREAM / AMPLITUDE MODULATION
FIG. 3B  SECOND SUB-INFORMATION DATA BIT STREAM / PHASE MODULATION
FIG. 3C  FIRST SUB-INFORMATION DATA BIT STREAM / SECOND SUB-INFORMATION DATA BIT STREAM / WOBBLE STRUCTURE OF THE PRESENT INVENTION

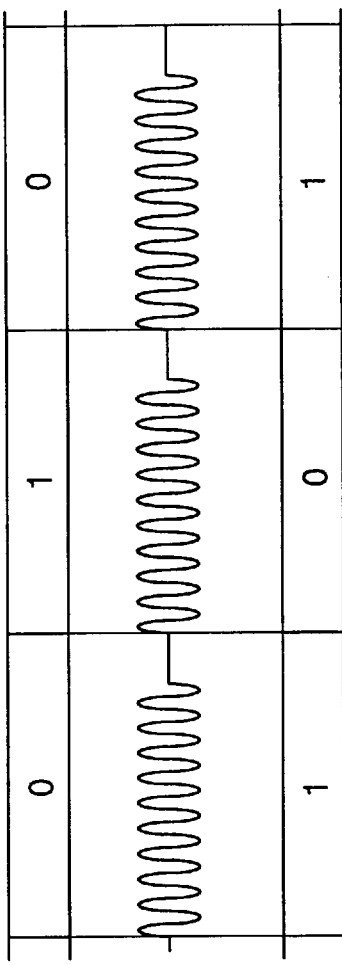
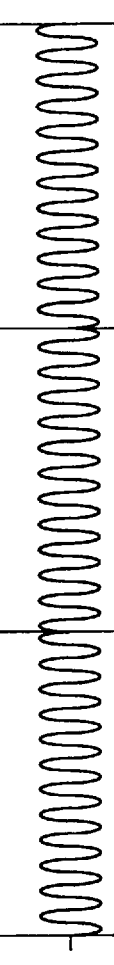
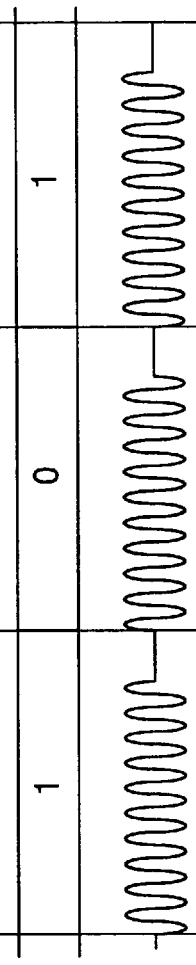
FIG. 4A  FIRST SUB-INFORMATION DATA BIT STREAM / IMPROVED AM MODULATION
FIG. 4B  SECOND SUB-INFORMATION DATA BIT STREAM / PHASE MODULATION
FIG. 4C  FIRST SUB-INFORMATION DATA BIT STREAM / SECOND SUB-INFORMATION DATA BIT STREAM / WOBBLE STRUCTURE OF THE PRESENT INVENTION

FIG. 5A
FIRST SUB-INFORMATION DATA BIT STREAM  "0"  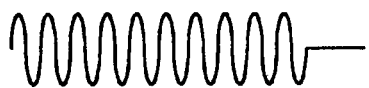
FIRST SUB-INFORMATION DATA BIT STREAM  "1"  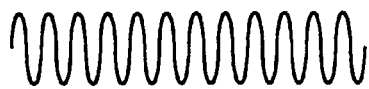
FIG. 5B
FIRST SUB-INFORMATION DATA BIT STREAM  "0"  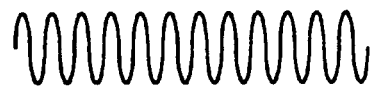
FIRST SUB-INFORMATION DATA BIT STREAM  "1"  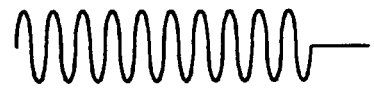

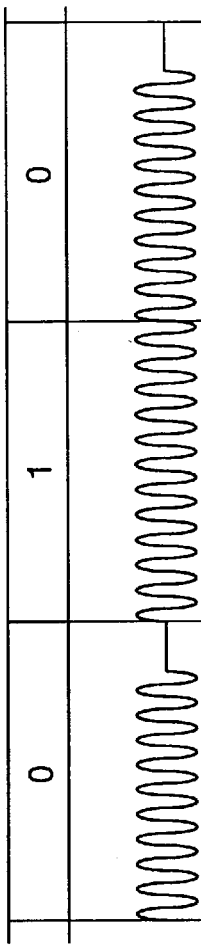
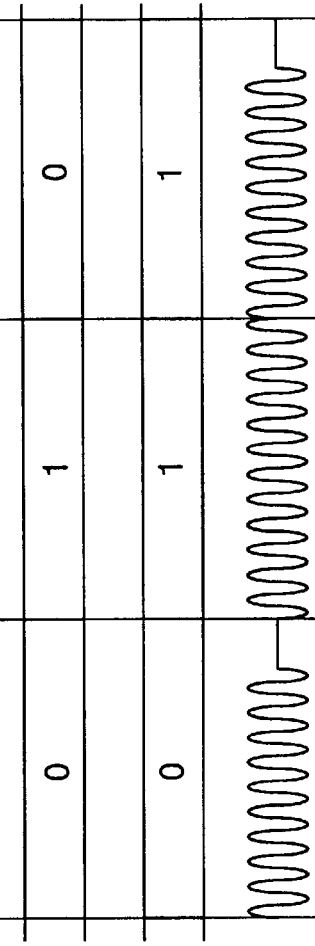
FIG. 6A  FIRST SUB-INFORMATION DATA BIT STREAM / AMPLITUDE MODULATION
FIG. 6B  SECOND SUB-INFORMATION DATA BIT STREAM / PHASE MODULATION
FIG. 6C  FIRST SUB-INFORMATION DATA BIT STREAM / SECOND SUB-INFORMATION DATA BIT STREAM / WOBBLE STRUCTURE OF THE PRESENT INVENTION

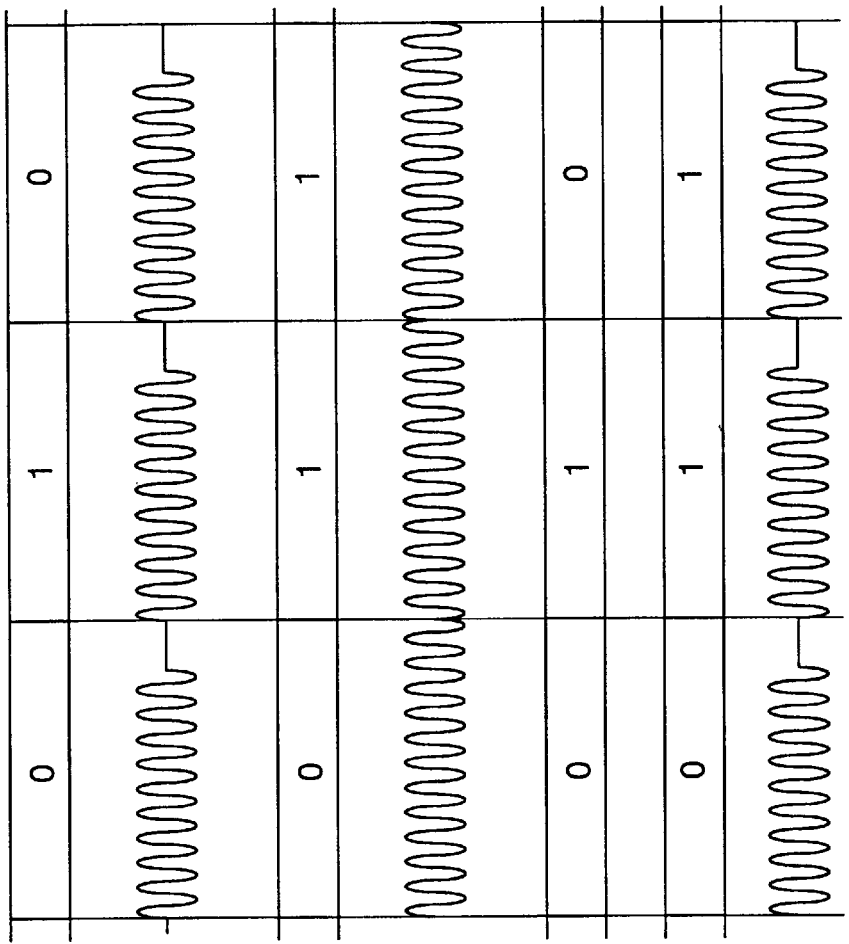
FIG. 7A  FIRST SUB-INFORMATION DATA BIT STREAM
IMPROVED AM MODULATION
FIG. 7B  SECOND SUB-INFORMATION DATA BIT STREAM
PHASE MODULATION
FIG. 7C  FIRST SUB-INFORMATION DATA BIT STREAM
SECOND SUB-INFORMATION DATA BIT STREAM
WOBBLE STRUCTURE OF THE PRESENT INVENTION

| < INPUT ><br>FIRST<br>SUB-INFORMATION<br>DATA BIT | < OUTPUT ><br>FIRST<br>CONVERTED SUB-INFORMATION<br>DATA BIT |
|---|---|
| 0 0 | 0 1 0 1 |
| 0 1 | 1 1 0 0 |
| 1 0 | 0 0 1 1 |
| 1 1 | 1 0 1 0 |

OPTICAL DISC

CROSS REFERENCE TO RELATED APPLICATIONS

This application claims the benefit of Japanese Patent Application Nos. 2000-124191 filed Apr. 25, 2000 and 2001-28286 filed on Feb. 5, 2001 in the Japanese Patent Office, the disclosures of which are incorporated herein by reference.

BACKGROUND OF THE INVENTION

1. Field of the Invention

The present invention relates to the physical format of a rewritable optical disc using a phase change medium or a magneto-optical (MO) medium, or a write once type optical disc using a pigment based medium, and more particularly, to the physical format suitable for handling data in a large amount such as image data or voice data.

2. Description of the Related Art

As a large capacity storage medium for a computer, a DVD (digital versatile disc), an MO disc (magneto-optical disc), or a CD (compact disc) is commercially used. Also, due to the spread of computers, a need for editing data stored in a storage medium increases so that a storage medium in which data can be modified or added is required.

As a rewritable storage medium on which a user can write and erase data many times, there is a DVD-RAM (DVD-random access memory) using a phase change medium, an MO disc using an MO medium, and a CD-RW (CD-rewritable). Also, as a write once type storage medium on which a user can write data only one time, there is a CD-R (CD-recordable) using a pigment based medium. In these storage media, addresses for identifying the positions where data is written are stored in advance. Also, an ID (identification) portion for indicating addresses is provided on the DVD-RAM or MO disc, separate from a portion where user data is stored.

Also, in the CD-RW or CD-R, the addresses are managed by a wobble/address method using an FM (frequency modulation) modulation. Here, the wobble means a wave and tracks on a disc are formed to be waved in a radial direction of the disc. That is, in the CD-RW or CD-R, the addresses are stored by changing the frequency of a wobble (wave) of a track. Thus, in the CD-RW or CD-R, the user data and address are stored along the track by being overlapped.

The above conventional technology has the following problems.

That is, in the DVD-RAM or MO disc, since the ID portion is needed separately from the portion where user data is stored, the efficiency in use of the area of a disc surface is deteriorated. Also, since the structures of the disc surfaces of the portion where user data is stored and the ID portion are different from each other, a process for manufacturing this disc is complicated so that manufacturing a disc is difficult. In particular, in the DVD-RAM, since the ID portion is arranged to be zigzag, a manufacturing process becomes more difficult.

Also, in the CD-RW or CD-R, since the address corresponds to the frequency of the wobble, in order for a disc reading apparatus to read the address, there is a need for reading a signal (wobble) of a different frequency, which makes the structure of the disc reading apparatus complicated.

Also, since the frequency of a wobble of a track is changed according to the value of an address, the length of a track needed for storing the address differs according to the value of the address. Thus, control of writing data is complicated.

Also, since the above method of matching the address to the frequency of the wobble is a method of storing the address by modulating the wobble by an FM modulation, the required C/N (carrier to noise) ratio is great so that it is difficult to secure reliability in reading and writing.

Also, a complicated demodulation circuit is needed to demodulate second sub-information from an optical disc where first and the second sub-information are recorded.

FIG. 13 is a block diagram showing the structure of a demodulation circuit for demodulating the second sub-information according to the conventional technology. Referring to the drawing, a wobble signal which is an input signal to the demodulation circuit is input to a multiplier 12 via a band-pass filter 11. A signal from a local oscillator 13 is input to the multiplier 12. An output signal of the multiplier 12 passes a low-pass filter 14 and is input to a plus/minus determining portion 15. The result of demodulation is output from the plus/minus determining portion 15.

That is, since detection of synchronism is needed in the conventional technology, the local oscillator 13 for outputting a signal of which the frequency and phase are synchronized with those of a wobble signal which is an input signal to the demodulation circuit, is needed to be provided in the demodulation circuit, which makes the demodulation circuit complicated.

SUMMARY OF THE INVENTION

To solve the above problems, it is an object of the present invention to provide an optical disc which has a superior efficiency in use of the area of a disc surface, of which manufacturing is made easy, by which the structure of a disc reading apparatus is simplified, which simplifies control of writing data on a disc, in which the C/N ratio is low, and in which reliability in reading and writing is high.

Also, it is an object of the present invention to provide an optical disc which simplifies the structure of the demodulation circuit.

Additional objects and advantages of the invention will be set forth in part in the description which follows and, in part, will be obvious from the description, or may be learned by practice of the invention.

Accordingly, to achieve the above and other objects, there is provided an optical disc has a track for recording user data, the optical disc comprising a wobble portion waved in a radial direction of the optical disc and a non-wobble portion that is not waved provided on the track, first sub-information and second sub-information which are data other than the user data recorded on the track by being overlapped, by using a combination of the wobble portion and the non-wobble portion, in the first sub-information, the length of at least one of the wobble portion and the non-wobble portion is different when a bit takes a logical value "0" and when the bit takes a logical value "1", and in the second sub-information, a phase of a wave in the wobble portion when a bit takes a logical value "0" is different from a phase of a wave in the wobble portion when the bit takes a logical value "1".

It may be in the present invention that, in the first sub-information, when a bit takes one of logical values "0" and "1", the non-wobble portion exists, and when the bit takes the other of logical values "0" and "1", the non-wobble portion does not exist.

It may be in the present invention that the length of the non-wobble portion is an integer multiple of one period of a wave in the wobble portion.

It is preferred in the present invention that the first sub-information is converted sub-information which is converted from original sub-information according to a predetermined rule of conversion.

It may be in the present invention that the lengths of the wobble portion and the non-wobble portion are integer multiples of one period of a wave in the wobble portion.

It may be in the present invention that, in the second sub-information, a phase of a wave of the wobble portion at transition points from the wobble portion to the non-wobble portion and from the non-wobble portion to the wobble portion, is a predetermined phase.

It may be in the present invention that, in the second sub-information, the difference between the phase of a wave of the wobble portion when a bit takes a logical value "0" and the phase of a wave of the wobble portion when the bit takes a logical value "1", is around 180°.

It may be in the present invention that at least one of the first sub-information and the second sub-information is an address in the track.

To also achieve the above and other objects, there is provided an optical disc which has a track for recording user data, the optical disc comprising a wobble portion waved in a radial direction of the optical disc and a non-wobble portion that is not waved provided on the track, first sub-information and second sub-information which are data other than the user data are recorded on the track by being overlapped, by using a combination of the wobble portion and the non-wobble portion, in the first sub-information, the length of at least one of the wobble portion and the non-wobble portion is different when a bit takes a logical value "0" and when the bit takes a logical value "1", and in the second sub-information, only when a bit takes a logical value "1", a phase of a wave in the wobble portion is changed with respect to a phase of a wave in the wobble portion of the preceding bit.

It may be in the present invention that, in the first sub-information, when a bit takes one of logical values "0" and "1", the non-wobble portion exists, and when the bit takes the other of logical values "0" and "1", the non-wobble portion does not exist.

It may be in the present invention that the length of the non-wobble portion is set to be an integer multiple of one period of a wave in the wobble portion.

It may be in the present invention that the amount of a change in the phase of a wave of the wobble portion in the second sub-information is around 180°.

It may be in the present invention that at least one of the first sub-information and the second sub-information is an address in the track.

It may be in the present invention that the lengths of the wobble portion and the non-wobble portion are set to be integer multiples of one period of a wave in the wobble portion.

BRIEF DESCRIPTION OF THE DRAWINGS

The above objects and advantages of the present invention will become more apparent by describing in detail preferred embodiments thereof with reference to the attached drawings in which:

FIGS. 3A, 3B and 3C are views showing the structure of a wobble/track formed on the optical disc according to a first embodiment of the present invention;

FIGS. 4A, 4B and 4C are views showing the structure of a wobble/track formed on the optical disc according to a second embodiment of the present invention;

FIGS. 5A and 5B are views showing bits and waveforms which are amplitude-modulated corresponding to the bits according to the first and third embodiments of the present invention;

FIGS. 6A, 6B and 6C are views showing the structure of a wobble/track formed on the optical disc according to a third embodiment of the present invention;

FIGS. 7A, 7B and 7C are views showing the structure of a wobble/track formed on the optical disc according to a fourth embodiment of the present invention;

DETAILED DESCRIPTION OF THE INVENTION

Figure 1:
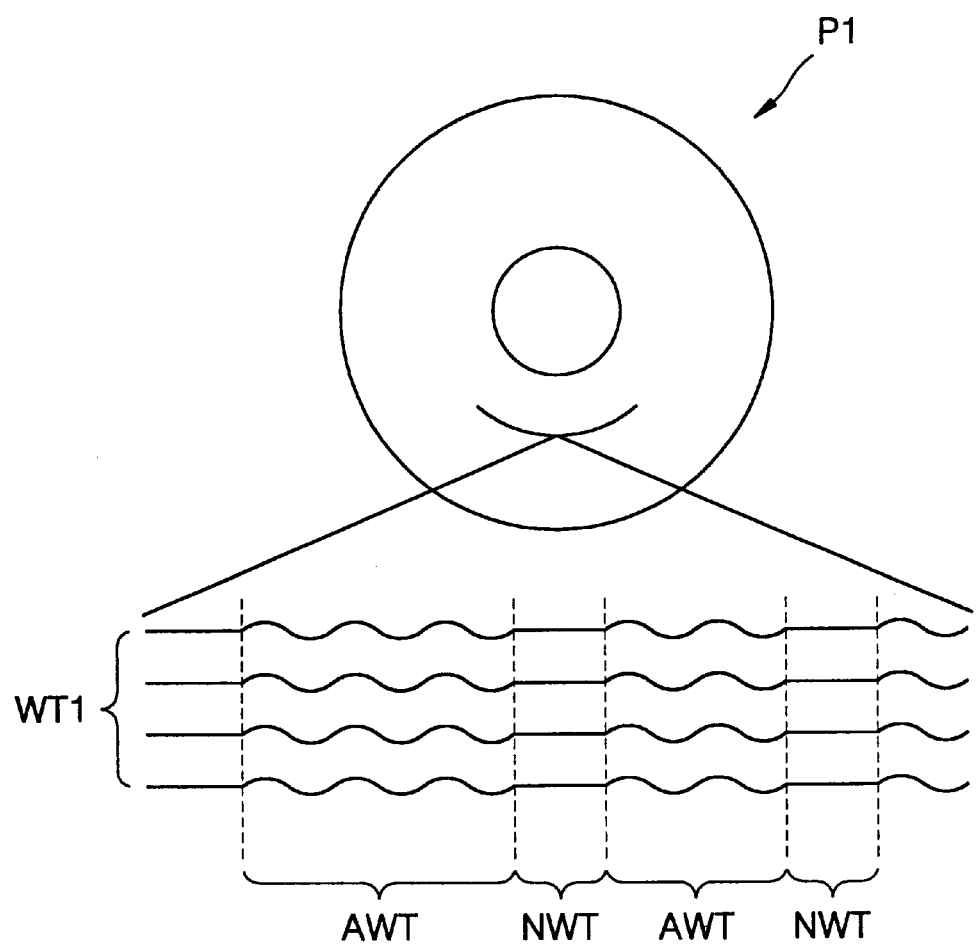
FIG. 1 is a view showing the structure of an optical disc in common in embodiments of the present invention.

Reference will now be made in detail to the embodiments of the present invention, examples of which are illustrated in the accompanying drawings, wherein like reference numerals refer to the elements throughout. The embodiments are described below in order to explain the present invention by referring to the figures.

Referring to FIG. 1, tracks are provided on the surface of an optical disc P1 and sub-information is recorded along the tracks. User data is recorded by being overlapped on the tracks where sub-information is recorded. Here, the sub-information is information other than user data, for example, an address. Also, various parameter information about the optical disc P1 are included in the sub-information.

The optical disc P1 is a rewritable optical disc such as a DVD-RAM using a phase change medium, a CD-RW, an MO disc using an MO medium, or a write once type optical disc such as a CD-R using a pigment based medium.

As shown in the drawing, wobble/tracks WT1 are provided on the surface of the optical disc P1. User data is recorded along the wobble/tracks WT1. Here, a wobble means a wave, that is, a structure in which a track is formed to be waved in a radial direction of the optical disc P1. The wobble/track WT1 includes a wobble portion AWT where the track is waved and a non-wobble portion NWT where the track is not waved, as shown in the drawing. The sub-information is recorded on the track by the combination of the wobble portion AWT and the non-wobble portion NWT.

Figure 2:
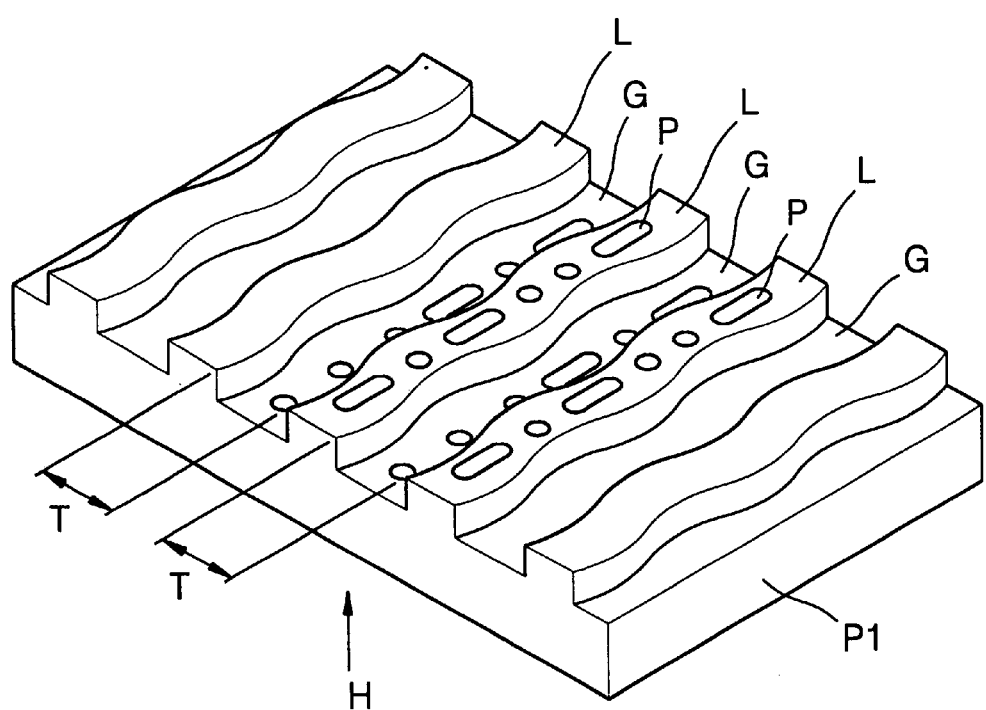
FIG. 2 is a perspective view showing the structure of a wobble/track on the optical disc.

FIG. 2 shows the structure of the wobble/track WT1 on the optical disc P1 in detail. A waved track recess T is provided on the surface of the optical disc P1. The bottom of the track recess T is called a groove G and a portion between the neighboring track recesses T is called a land L. A waved portion of the track recess T is called a wobble.

When user data is recorded on the optical disc P1 by using a land/groove recording method, recording marks P are formed at both of the land L and groove G. Also, to read the recorded data, light H is input toward the bottom surface of the optical disc P1.

The wobble of the track recess T is used for indicating sub-information of the user data recorded on the optical disc P1. The sub-information signifies the position of the user data recorded along the track recess T, that is, an address. Thus, the user data and the sub-information are recorded by being overlapped along the track recess T of the optical disc P1.

FIGS. 3A, 3B and 3C show the structure of a wobble/track formed on the optical disc according to a first embodiment of the present invention. In the optical disc according to the present embodiment, two types of sub-information, that is, first sub-information and second sub-information, are recorded on a single track by being overlapped.

The two types of sub-information are modulated by different methods. That is, the first sub-information is amplitude modulated as shown in FIG. 3A. In detail, the first sub-information is constituted by a bit "0" including the wobble portion and the non-wobble portion and a bit "1" including the wobble portion only. That is, the amplitude modulation here is a digital modulation which is advantageous in securing reliability in an optical disc system generating much noise, compared with an analog modulation. In contrast, the combination opposite to the above, that is, the bit "0" includes the wobble portion only while the bit "1" includes both the wobble portion and the non-wobble portion, is possible.

The second sub-information is phase modulated, as shown in FIG. 3B. In detail, the second sub-information is constituted by bits "0" and "1" and the phase of the wobble is different by 180°. By making the phase different by 180°, reliability can be secured in an optical disc system where much noise is generated. Also, the waveform of the wobble is formed to return to the center of the amplitude at transition points from the bit "0" to the bit "1" and from the bit "1" to the bit "0".

The result of synthesis of the first sub-information and the second sub-information is a waveform shown in FIG. 3C and the waveform is a waveform of a wobble/track on the optical disc. Thus, two types of sub-information are recorded on the wobble/track by being overlapped.

FIGS. 4A, 4B and 4C show the structure of a wobble/track formed on the optical disc according to a second embodiment of the present invention. In the optical disc according to the present embodiment, two types of sub-information, that is, the first sub-information and the second sub-information, are recorded on a single track by being overlapped. However, in the present embodiment, the first sub-information recorded on a track is converted sub-information obtained by converting the original sub-information according to a predetermined conversion rule. The converted sub-information and the rule of the conversion will be described later.

The two types of sub-information are modulated by different methods. That is, the first sub-information is improved-AM modulated which will be described later.

The second sub-information is phase modulated, as shown in FIG. 4B. The phase modulation is the same as that in the first embodiment. The result of synthesis of the first sub-information and the second sub-information is a waveform shown in FIG. 4C and the waveform is one of a wobble/track on the optical disc. Thus, the two types of sub-information are recorded on the wobble/track by being overlapped.

In this second embodiment, the phase of a wave in the wobble portion changes when the logical value changes from "0" to "1" and when the logical value changes from "1" to "0".

FIGS. 5A and 5B show bits and waveforms which correspond to the bits and of which amplitudes are modulated according to first and third embodiments of the present invention. In FIG. 5A, the bit "0" corresponds to a waveform including the wobble portion and the non-wobble portion and the bit "1" corresponds to a waveform including the wobble portion only. In contrast, in FIG. 5B, the bit "0" corresponds to a waveform including the wobble portion only and the bit "1" corresponds to a waveform including the wobble portion and the non-wobble portion. In these waveforms, the length (period) of the non-wobble portion is set to be an integer multiple of the period of a wobble in the wobble portion. The above setting facilitates manufacturing of an optical disc and enables a stable operation of a PLL control system in an apparatus for reading the wobble. Also, it is obvious that other methods may be used as the amplitude modulation method.

As a third embodiment of the present invention, the first sub-information is amplitude modulated, as shown in FIG. 6A. The bit "0" constituting the first sub-information includes the wobble portion and the non-wobble portion while the bit "1" constituting the first sub-information includes the wobble portion only. Also, the second sub-information is phase modulated, as shown in FIG. 6B. In detail, only when the bit constituting the second sub-information is "1", the phase of a waveform of a wobble of the preceding bit is shifted by 180°. When the bit constituting the second sub-information is "0", the phase shift is not performed.

By shifting the phase by 180°, reliability of the optical disc system where much noise is generated is secured. Also, the waveform of the wobble is formed to return to the center of the amplitude at transition points from the bit "0" to the bit "1" and from the bit "1" to the bit "0" for both the first and second sub-information. The above structure facilitates manufacturing of an optical disc.

The result of synthesis of the first sub-information and the second sub-information is a waveform shown in FIG. 6C and the waveform is a waveform of a wobble/track on the optical disc.

FIGS. 7A, 7B and 7C show the structure of a wobble/track formed on the optical disc according to a fourth embodiment of the present invention. In the optical disc according to the present embodiment, two types of sub-information, that is, the first sub-information and the second sub-information, are recorded on a single track by being overlapped. The two types of sub-information are modulated by different methods. That is, the first sub-information is improved-AM modulated, as shown in FIG. 7A.

The second sub-information is phase modulated, as shown in FIG. 7B. The phase modulation is the same as that in the second embodiment. The result of synthesis of the first sub-information and the second sub-information is a waveform shown in FIG. 7C and the waveform is one of a wobble/track on the optical disc.

Meanwhile, in the fourth embodiment, only when a bit has a logical value of "1", the phase of a wave in the wobble portion is changed with respect to the phase of a wave in the wobble portion of a preceding bit. Accordingly, when a bit has a logical value of "0", the phase of the wave in the wobble portion does not change with respect to the phase of the wave in the wobble portion of the preceding bit. Conversely, it is also possible that only when a bit has a logical value of "0", the phase of a wave in the wobble portion is changed with respect to the phase of a wave in the wobble portion of a preceding bit.

Figures 8, 9:
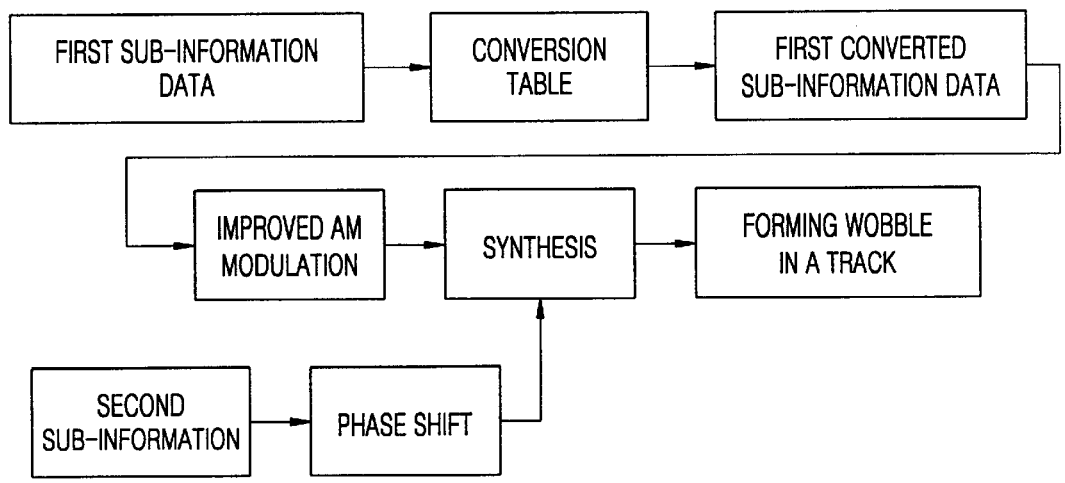
FIG. 8 is a block diagram showing the sequence of recording sub-information on a wobble of a track.
FIG. 9 is a view showing an example of a conversion table.

FIG. 8 shows the sequence of recording sub-information on a wobble of a track, that is, forming a wobble/track on the optical disc based on the sub-information data. Referring to the drawing, first, the first sub-information data is converted to the first converted sub-information data according to a conversion table. Next, the first converted sub-information data is improved-AM modulated. The improved-AM modulated waveform is synthesized with the phase-shifted waveform which is the second sub-information. The synthesized waveform becomes a wobble of a track.

FIG. 9 shows an example of a conversion table, that is, the rule of conversion. As described above, the conversion table receives the first sub-information data and outputs the first converted sub-information data. The first sub-information data and the first converted sub-information data are all digital data formed of bits "0" and "1". According to the conversion table, the first sub-information data formed of 2 bits is converted to the first converted sub-information data formed of 4 bits. In any event, the first converted sub-information data includes the same number of bits "0" and "1". That is, of the first converted sub-information data formed of 4 bits, two bits are "0" and the remaining two bits are "1".

Figure 10A:
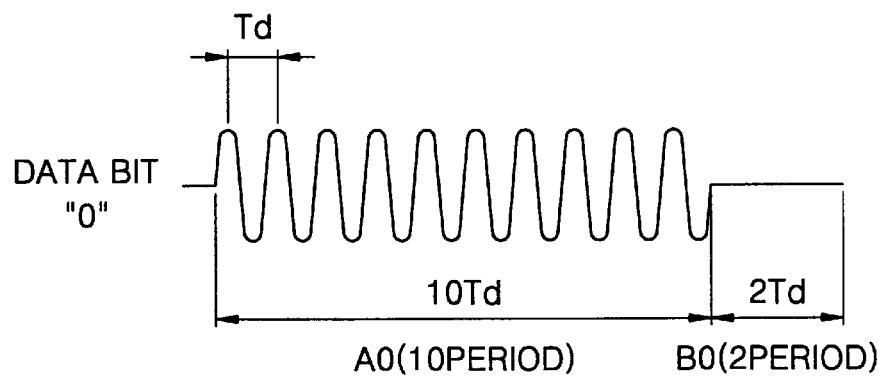
FIGS. 10A and 10B are views showing an example of a waveform generated by an improved AM modulation according to the second and fourth embodiments of the present inventor.
Figure 10B:
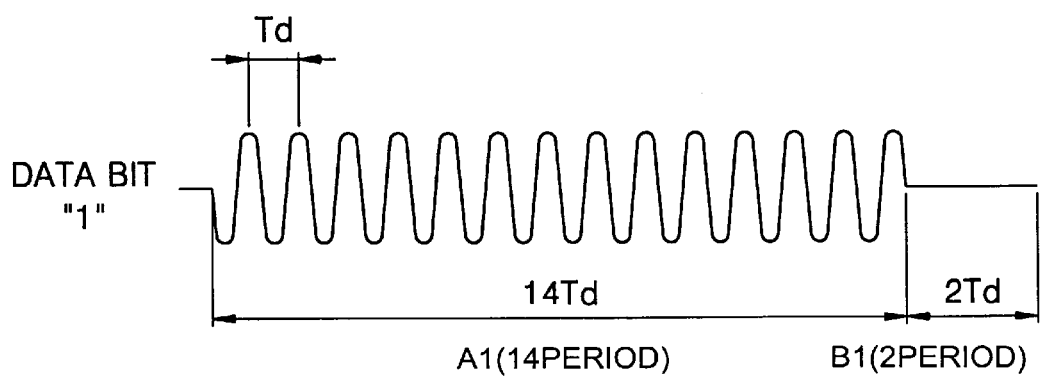

FIGS. 10A and 10B show an example of a waveform generated by an improved AM modulation according to the second and fourth embodiments of the present invention. By the improved AM modulation, the bit "0" included in the first converted sub-information data is converted to a waveform shown in FIG. 10A and the bit "1" included in the first converted sub-information data is converted to a waveform shown in FIG. 10B.

The waveform corresponding to the bit "0" shown in FIG. 10A includes a wobble section A0 having 10 periods (Td) of waves and a non-wobble section B0 that is not waved. The length of the non-wobble section B0 corresponds to 2 periods of waves in the wobble section A0. Also, the period Td of waves in the wobble section A0 is always uniform.

The waveform corresponding to the bit "1" shown in the FIG. 10B includes a wobble section A1 having 14 periods (Td) of waves and a non-wobble section B1 that is not waved. The length of the non-wobble section B1 corresponds to 2 periods of waves in the wobble section A1. Also, the period Td of waves in the wobble section A1 is always uniform and is the same as the period Td of waves in the wobble section A0 included in the waveform corresponding to the bit "0". Thus, the length of the non-wobble section B1 included in the waveform corresponding to the bit "1" is the same as the length of the non-wobble section B0 included in the waveform corresponding to the bit "0".

The lengths of A0, B0, A1, and B1 are expressed by units of period Td of waves in common as follows.

(A0, B0)=(10, 2)

(A1, B1)=(14, 2)

That is, since the bit "0" and the bit "1" are differentiated from each other by the length of a continuing section, there is no need to change the frequency of the wobble.

Also, the length of the wobble section A0 or A1 is not limited to 10 periods or 14 periods but can be arbitrarily set. Also, in the above example, the length of the non-wobble section B0 included in the bit "0" is the same as the length of the non-wobble section B1 included in the bit "1". That is, B0=B1=the length of 2 periods of wobble Thus, since there is no need to change the length of the non-wobble section according to the bit "0" or the bit "1", an optical disc is simply manufactured. Also, the length of the non-wobble section B0 or B1 is preferably as long as the length of 1 or 2 periods of wobbles, considering the effect on a PLL circuit for synchronizing the wobble. However, the length is preferably determined according to the system adopting the present invention. The present invention is not limited to the length of the non-wobble section B0 or B1 set to correspond to the length of 1 or 2 periods of wobbles.

According to the conversion table and the waveforms, all of the first converted sub-information data have the same lengths on the track. That is, the lengths of waveforms indicating the bit "0" and the bit "1" constituting the first converted sub-information data are different from each other, so that the length of each waveform on the track is different. However, since the first converted sub-information data is necessarily formed of a set of four bits and must include the same numbers of the bit "0" and the bit "1" in a set, any value of the first converted sub-information data has the same length on the track which corresponds to four bits. Thus, the length of the first converted sub-information data on the track is set to be uniform so that control in data writing is made easy.

Also, in the above example, the length of the non-wobble section B0 included in the bit "0" and the length of the non-wobble section B1 included in the bit "1" in the first converted sub-information data are set to be the same. However, the length of these non-wobble sections B0 and B1 may be set to be different and the difference in the length of the non-wobble section is used for identifying bits, while the length of the first converted sub-information data corresponding to 4 bits does not change.

Figure 11A:
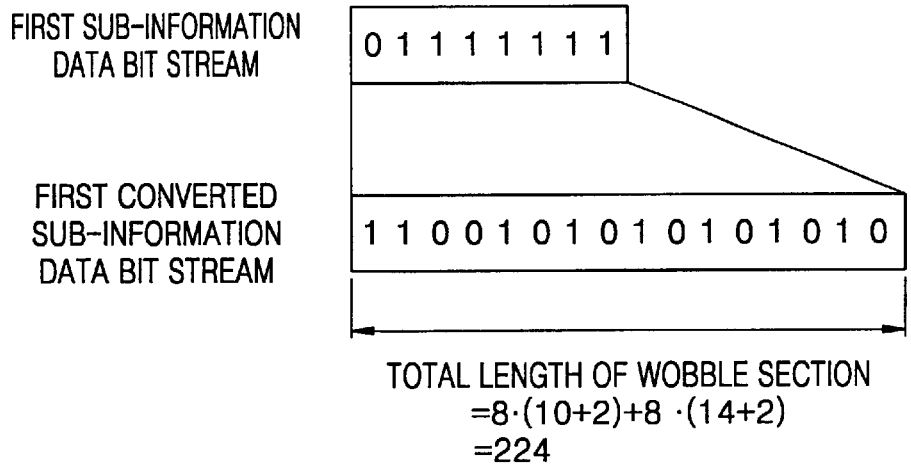
FIGS. 11A and 11B are views showing an example of conversion from the first sub-information data to the first converted sub-information data.
Figure 11B:
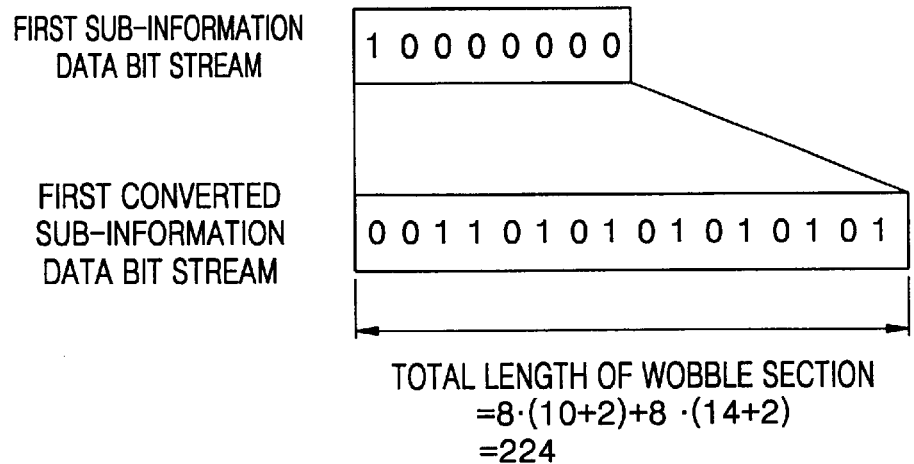

FIGS. 11A and 11B show an example of conversion from the first sub-information data to the first converted sub-information data. As shown in the drawings, when the first sub-information data is assumed to include 8 bits, the first converted sub-information data converted from the first sub-information data by using the conversion table becomes 16 bits where 8 bits are "0" and the remaining 8 bits are "1".

In detail, in FIG. 11A, the first sub-information data (01111111) is converted to the first converted sub-information data (1100101010101010) according to the conversion table of FIG. 9. That is, the leading 2 bits (01) of the first sub-information data is converted to the first converted sub-information data (1100) of 4 bits according to the conversion table of FIG. 9. Next, each of the subsequent 2 bits of the first sub-information data (11) is converted to the first converted sub-information data (1010) of 4 bits.

When the length of the overall bit stream of the first converted sub-information data is expressed by units of periods (Td) of the wobble, the total length =the length of "0"+the length of "1"

=8 bits×(10 Td+2 Td)+8 bits×(14 Td+2 Td)

=224 Td.

In FIG. 11B, the first sub-information data (10000000) is converted to the first converted sub-information data (0011010101010101) by the conversion table of FIG. 9. That is, the leading 2 bits (10) of the first sub-information data is converted to the first converted sub-information data (0011) of 4 bits and each of the subsequent 2 bits of the first sub-information data (00) is converted to the first converted sub-information data (0101) of 4 bits.

When the length of the overall bit stream of the first converted sub-information data is expressed by units of periods (Td) of the wobble, the total length =the length of "0"+the length of "1"

=8 bits×(10 Td+2 Td)+8 bits×(14 Td+2 Td)

=224 Td.

Thus, the total length is the same as that shown in FIG. 11A. That is, when the first sub-information data constituted by a constant number of bits is recorded on the track, the length of the first sub-information data is always the same which facilitates manufacturing an optical disc.

Also, when all of A0, B0, A1 and B1 are set to be integer multiples of the period (Td) of the wobble, manufacturing of an optical disc is made easy. Also, a PLL control system in a wobble reading apparatus is stably operated.

Figure 12:
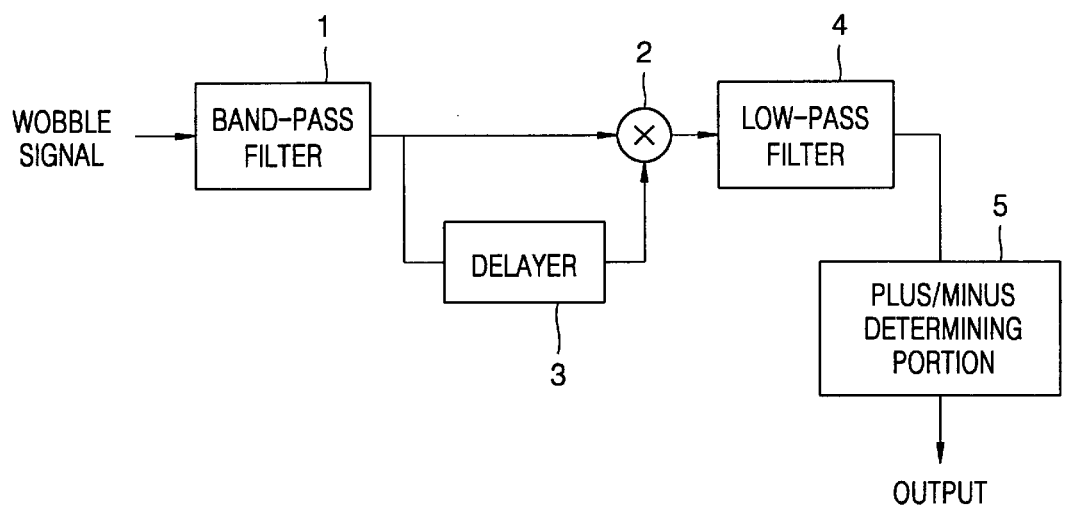
FIG. 12 is a block diagram showing the structure of a demodulation circuit for demodulating the second sub-information recorded on an optical disc according to the present invention.
Figure 13:
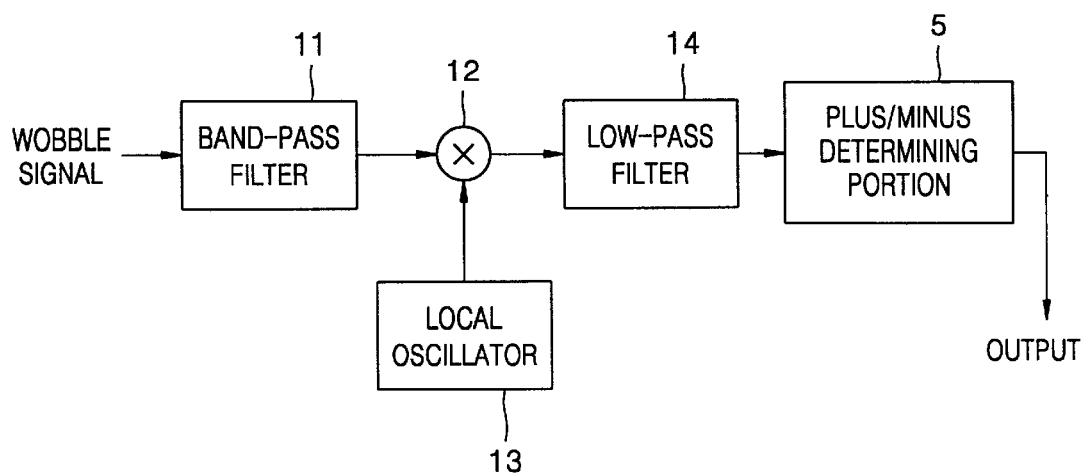
FIG. 13 is a block diagram showing the structure of a demodulation circuit for demodulating the second sub-information recorded on a conventional optical disc.

FIG. 12 shows the structure of a demodulation circuit for demodulating the second sub-information recorded on an optical disc according to the present invention. In the drawing, a wobble signal that is an input signal to the demodulation circuit is input to a multiplier 2 via a band-pass filter 1 and to a delayer 3. The delayer 3 delays an input signal, for example, as long as one period of a waveform of wobble.

The output from the delayer 3 is input to the multiplier 2. That is, the multiplier 2 multiplies the output of the band-pass filter 1 and the output of the delayer 3. Accordingly, after changing bits, when the present waveform and the one bit preceding waveform are of the same phase, a plus sign is output. and when the present waveform and the one bit preceding waveform have the inverse phases (phases different by 180°), a minus sign is output. That is, a minus sign is output only when the bit is changed to "1".

The output of the multiplier 2 is input to a plus/minus determining portion 5 via a low-pass filter 4. The plus/minus determining portion 5 outputs the result of demodulation. That is, in the optical disc according to the present invention, since a delay detection system may be adopted, there is no need to generate a signal synchronized with a wobble signal in the demodulation circuit, so that the structure of the demodulation circuit is simplified.

As described above, according to the present invention, since two types of sub-information are recorded on one track, by being overlapped, by amplitude-modulating the first sub-information and phase-modulating the second sub-information, and by synthesizing both first and second sub-information, a large amount of sub-information can be recorded on the optical disc compared to the conventional technology. Thus, the present invention can provide a format suitable for an optical disc having large capacity.

Also, in the first sub-information, when the bit takes any one of logical values "0" and "1", the non-wobble portion exists, and when the bit takes the other logical value "0" or "1", the non-wobble portion does not exist. Thus, amplitude information can be overlapped user data on a track with a simple structure.

Also, when the length of the non-wobble portion is set to be an integer multiple of one period of a wave in the wobble portion, manufacturing of an optical disc is made easy. Also, when a PLL control system is configured based on a wobble signal, the PLL control system can be stably maintained.

Also, when the first sub-information is converted to the first converted sub-information according to a predetermined rule of conversion, amplitude information can be overlapped with user data on a track with a simple structure.

Also, when the lengths of the wobble portion and the non-wobble portion are set to be integer multiples of one period of a wave, manufacturing of an optical disc is made easy. Also, when the PLL control system is configured based on a wobble signal, the PLL control system can be stably maintained.

Also, in the second sub-information, the phase of a wave of the wobble portion at transition points from the wobble portion to the non-wobble portion and from the non-wobble portion to the wobble portion, is a predetermined phase.

Also, in the second sub-information, the difference between the phase of a wave of the wobble portion when a bit takes a logical value "0" and the phase of a wave of the wobble portion when the bit takes a logical value "1", is around 180°.

Although the present invention has been described with reference to the preferred examples, the foregoing disclosure should be interpreted as illustrative only and it should be understood that various modifications and variations can be easily made by those skilled in the art without departing from the spirit of the invention, the scope of which is defined in the claims and their equivalents.

What is claimed is:

1. An optical disc which has a track for recording user data, the optical disc comprising:
    a wobble portion waved in a radial direction of the optical disc and a non-wobble portion that is not waved, which are provided on the track; and
    first sub-information and second sub-information which are data other than the user data recorded on the track by being overlapped, by using a combination of the wobble portion and the non-wobble portion,
    wherein, in the first sub-information, a length of at least one of the wobble portion and the non-wobble portion is different when a bit takes a logical value "0" and when the bit takes a logical value "1", and
    in the second sub-information, a phase of a wave in the wobble portion when a bit takes a logical value "0" is different from a phase of a wave in the wobble portion when the bit takes a logical value "1".

2. The optical disc as claimed in claim 1, wherein, in the first sub-information, when the bit takes one of logical values "0" and "1", the non-wobble portion exists, and when the bit takes the other of logical values "0" and "1", the non-wobble portion does not exist.

3. The optical disc as claimed in claim 2, wherein the length of the non-wobble portion is an integer multiple of one period of a wave in the wobble portion.

4. The optical disc as claimed in claim 1, wherein the first sub-information is sub-information which is converted from original sub-information according to a predetermined rule of conversion.

5. The optical disc as claimed in claim 4, wherein the lengths of the wobble portion and the non-wobble portion are integer multiples of one period of a wave in the wobble portion.

6. The optical disc as claimed in claim 1, wherein, in the second sub-information, phase of a wave of the wobble portion at transition points from the wobble portion to the non-wobble portion and from the non-wobble portion to the wobble portion, is a predetermined phase.

7. The optical disc as claimed in claim 6, wherein, in the second sub-information, a difference between the phase of the wave of the wobble portion when the bit takes the logical value "0" and the phase of the wave of the wobble portion when the bit takes the logical value "1", is around 180°.

8. The optical disc as claimed in claim 1, wherein at least one of the first sub-information and the second sub-information is an address in the track.

9. An optical disc which has a track for recording user data, the optical disc comprising:
    a wobble portion waved in a radial direction of the optical disc and a non-wobble portion that is not waved, which are provided on the track;
    first sub-information and second sub-information which are data other than the user data recorded on the track by being overlapped, by using a combination of the wobble portion and the non-wobble portion;
    wherein, in the first sub-information, a length of at least one of the wobble portion and the non-wobble portion is different when a bit takes a logical value "0" and when the bit takes a logical value "1", and
    in the second sub-information, only when a bit takes one of the logical values "0" and "1", a phase of a wave in the wobble portion is changed with respect to a phase of a wave in the wobble portion of a preceding bit.

10. The optical disc as claimed in claim 9, wherein, in the first sub-information, when the bit takes one of logical values "0" and "1", the non-wobble portion exists, and when the bit takes the other of logical values "0" and "1", the non-wobble portion does not exist.

11. The optical disc as claimed in claim 10, wherein a length of the non-wobble portion is set to be an integer multiple of one period of a wave in the wobble portion.

12. The optical disc as claimed in claim 11, wherein an amount of a change in the phase of the wave of the wobble portion in the second sub-information is around 180° when bits change between "0" and "1".

13. The optical disc as claimed in claim 12, wherein at least one of the first sub-information and the second sub-information is an address in the track.

14. The optical disc as claimed in claim 10, wherein lengths of the wobble portion and the non-wobble portion are set to be integer multiples of one period of a wave in the wobble portion.

15. The optical disc as claimed in claim 14, wherein an amount of a change in the phase of the wave of the wobble portion in the second sub-information is around 180° when bits change between "0" and "1".

16. The optical disc as claimed in claim 15, wherein at least one of the first sub-information and the second sub-information is an address in the track.

17. The optical disc as claimed in claim 10, wherein an amount of a change in the phase of the wave of the wobble portion in the second sub-information is around 180° when bits change between "0" and "1".

18. The optical disc as claimed in claim 17, wherein at least one of the first sub-information and the second sub-information is an address in the track.

19. The optical disc as claimed in claim 9, wherein a length of the non-wobble portion is an integer multiple of one period of a wave in the wobble portion.

20. The optical disc as claimed in claim 19, wherein an amount of a change in the phase of the wave of the wobble portion in the second sub-information is around 180° when bits change between "0" and "1".

21. The optical disc as claimed in claim 20, wherein at least one of the first sub-information and the second sub-information is an address in the track.

22. The optical disc as claimed in claim 9, wherein lengths of the wobble portion and the non-wobble portion are integer multiples of one period of a wave in the wobble portion.

23. The optical disc as claimed in claim 9, wherein an amount of a change in the phase of the wave of the wobble portion in the second sub-information is around 180° when bits change between "0" and "1".

24. The optical disc as claimed in claim 9, wherein at least one of the first sub-information and the second sub-information is an address in the track.

25. The optical disc as claimed in claim 1, wherein the optical disc is one of a rewritable optical disc using a phase change medium, a magneto-optical (MO) medium, and a write once type optical disc using a pigment based medium.

26. The optical disc as claimed in claim 9, wherein the optical disc is one of a rewritable optical disc using a phase change medium, a magneto-optical (MO) medium, and a write once type optical disc using a pigment based medium.

27. An optical disc which has a track for recording user data, comprising:
  a wobble portion waved in a radial direction of the optical disc and a non-wobble portion that are not waved, provided on the track; and
  first and second sub-information which are data other than the user data and recorded on the track in an overlapping manner, using a combination of the wobble portion and the non-wobble portion.

28. The optical disc as claimed in claim 27, wherein the first sub-information is modulated according to a first type of modulation and the second sub-information is modulated according to a second type of modulation different from the first type of modulation.

29. The optical disc as claimed in claim 28, wherein the first type of modulation is an amplitude modulation and the second type of modulation is a phase modulation.

30. The optical disc as claimed in claim 28, wherein the first type of modulation is amplitude modulation, a first bit of a first logical value of the first sub-information includes the wobble portion and the non-wobble portion and a second bit of a second logical value of the first sub-information includes only the wobble portion.

31. The optical disc as claimed in claim 30, wherein the second type of modulation is phase modulation, and first and second bits of first and second logical values have a phase difference of about 180°.

32. A demodulation circuit for an optical disc having a track for recording user data, a wobble portion waved in a radial direction of the optical disc and a non-wobble portion that are not waved, provided on the track, first and second sub-information which are data other than the user data and recorded on the track in an overlapping manner, using a combination of the wobble portion and the non-wobble portion, wherein a light radiated on the track produces a wobble signal, the demodulation circuit comprising:
  a band-pass filter filtering the wobble signal;
  a delayer delaying the filtered wobble signal up to one period of the wobble signal;
  a multiplier multiplying the filtered wobble signal and the delayed filtered wobble signal, to generate a multiplied signal;
  a low-pass filter filtering the multiplied signal; and
  a plus/minus determining unit outputting a first sign when a present waveform and the one preceding bit waveform are of the same phase, and outputting a second sign opposite the first sign when the present waveform and the one preceding bit waveform have inverse phases.

* * * * *